April 30, 1935.  G. A. HEALIS ET AL  1,999,565
ELECTRIC CIRCUIT CONTROLLER
Original Filed April 15, 1932  5 Sheets-Sheet 1

INVENTORS
George A. Healis and
Herbert C. Graves Jr
BY Cornelius D. Ehret
their ATTORNEY.

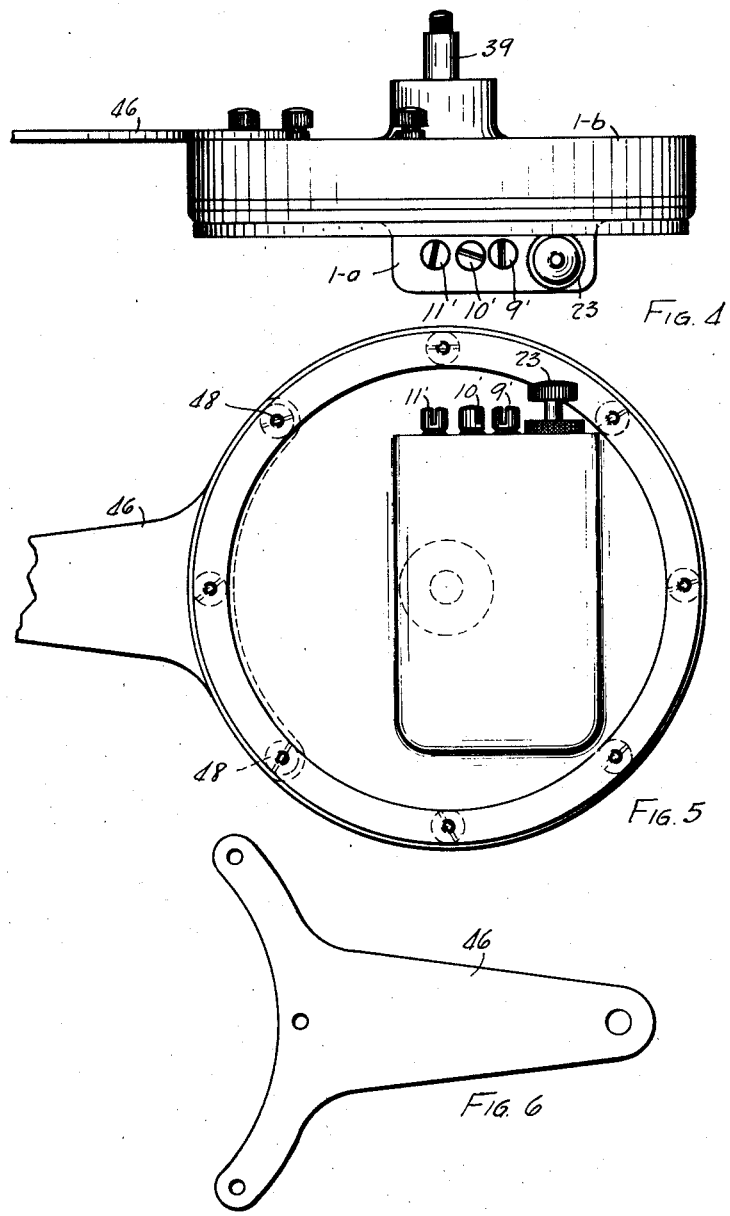

April 30, 1935.    G. A. HEALIS ET AL    1,999,565
ELECTRIC CIRCUIT CONTROLLER
Original Filed April 15, 1932    5 Sheets-Sheet 3

INVENTORS
George A. Healis and
Herbert C. Graves Jr
Cornelius L. E Lret
BY
their ATTORNEY.

April 30, 1935.  G. A. HEALIS ET AL  1,999,565
ELECTRIC CIRCUIT CONTROLLER
Original Filed April 15, 1932   5 Sheets-Sheet 4
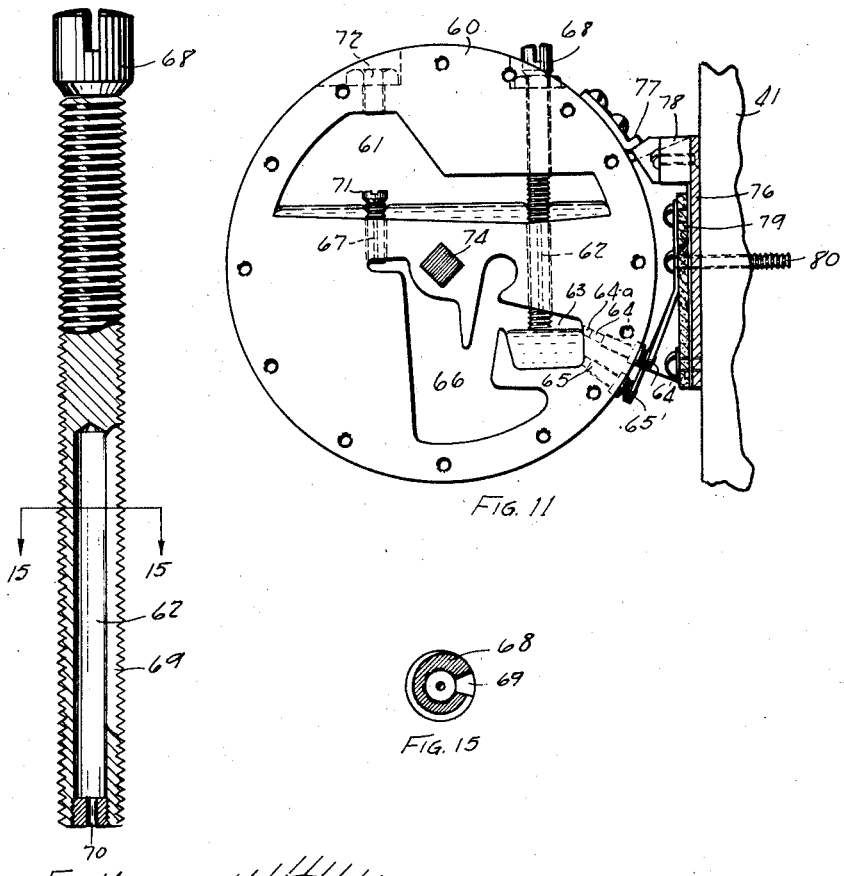
INVENTORS
George A. Healis and
Herbert C. Gravell Jr
BY
Cornelius D. Ehret
their ATTORNEY.

April 30, 1935. G. A. HEALIS ET AL 1,999,565
ELECTRIC CIRCUIT CONTROLLER
Original Filed April 15, 1932   5 Sheets-Sheet 5

INVENTORS
George A. Healis and
Herbert C. Graves Jr
Cornelius L. C. Leet
BY their ATTORNEY.

Patented Apr. 30, 1935

1,999,565

UNITED STATES PATENT OFFICE 1,999,565

ELECTRIC CIRCUIT CONTROLLER

George A. Healis, Philadelphia, and Herbert C. Graves, Jr., East Bradford Township, Chester County, Pa., assignors to I-T-E Circuit Breaker Company, Philadelphia, Pa., a corporation of New Jersey Original application April 15, 1932, Serial No. 605,490. Divided and this application March 26, 1934, Serial No. 717,394

25 Claims. (Cl. 200—33)

Our invention relates to new and improved electric circuit controllers and, while our invention is of general application to electric control circuits and systems, it is particularly suitable for use in connection with control systems of the type disclosed and claimed in our copending application Serial No. 605,490, filed April 15, 1932, of which this application is a division.

More specifically, our invention relates to circuit controllers of the type disclosed and claimed in the copending application of William M. Scott, Serial No. 717,395, filed March 26, 1934.

Our invention is directed broadly to circuit controllers in which the functions of two cooperating units comprised in a circuit controller of the type described in the last-mentioned application, are combined into a single unit; in addition, different time delays are secured for successive operations of the circuit controller as, for example, are useful in connection with controlling the reclosing of a circuit breaker. More specifically, the times between successive reclosings of the breaker may be progressively increased.

In general, the electric circuit controllers disclosed in the above-mentioned Scott application comprise one or more envelopes or casings, each including a plurality of chambers and movable between predetermined positions. The chambers of each envelope are in intercommunication as by passages, channels, orifices, or the like, to form a closed system in which is disposed a quantity of suitable fluid. Associated with each envelope is a contact structure, the circuit controlling relation or condition of which is changed in response to a predetermined level of fluid in one of the chambers. The disposition of the chambers of the envelope and their interconnecting passages is such that movements of the envelope between its predetermined positions effect the flow of fluid between the chambers in a predetermined sequence.

The present invention is directed to a circuit controller in which the plurality of envelopes above described may be replaced by a single envelope, and in which the flow of fluid between the chambers is controlled, by interconnecting passages or orifices, to raise the fluid level in the chamber with which the contact structure is associated in response to successive and correlated movements of the envelope for only a predetermined number of times, and to impart predetermined time delays into the successive changes of the circuit controlling condition of the contact structure. By "successive and correlated movements" of the envelope, as this expression is used hereinafter, we refer to movements separated by relatively short time intervals and/or correlated in time with respect to the characteristics of the controlled circuit or system, or to those of the circuit controller as, for example, determined by the viscosity of the fluid or the size and number of the controlling passages or orifies. One example of such successive and correlated movements is the successive reclosings of a circuit breaker separated by definite time intervals, which may vary from a few seconds to as much as a few minutes. However, our invention is not limited to successive movements of the circuit controller separated by time intervals of any definite magnitude, but applies to a circuit controller in which the movements are separated by any time intervals correlated with the characteristics of the controller and/or the system of which it forms a part.

In accordance with another feature of our invention, the envelope may include also an overflow chamber communicating with the fluid system and effective to change the circuit controlling condition of auxiliary contact structure associated therewith when the level of the fluid in one of the chambers of the system rises above a predetermined magnitude. This condition may occur, for example, when the main contact structure is utilized to control the movement of the envelope and when the circuit controller is locked into an inoperative condition in response to a predetermined number of successive and correlated operations.

Specifically, and in accordance with another modification of our invention, the circuit controller may comprise a plurality of units of the type described above, each employing but a single controlling passage or orifice for determining the time delay in the operation of its associated contact structure. In this instance, any particular unit will effect only a single change in the circuit controlling condition of its associated contact structure in response to successive and correlated movements thereof. The several units may be adjusted with different timing characteristics varying progressively, or otherwise, from any given value which may be substantially zero or a very small magnitude, in accordance with the requirements of the system.

The invention resides in the novel features of an electric circuit controller of the character hereinafter described and claimed.

In order more clearly to describe the invention, and for illustration of some of the various forms it may take, reference is had to the accompanying drawings in which:

Fig. 4 is a view looking down upon the circuit controller in its operative position;

Fig. 5 is a side elevational view of the circuit controller;

Fig. 6 is a detail of an operating lever for the circuit controller;

Fig. 11 is a side elevational view of a modified form of the circuit controller, with its enclosing cover removed, showing the arrangement of the various chambers and passages therein;

Fig. 11a is an enlarged cross-sectional view of a contact enclosing chamber;

Fig. 14 is a view of one of the fluid controlling parts of the circuit controller;

Fig. 15 is a sectional view, taken along the line 15—15 of Fig. 14.

Figure 2:
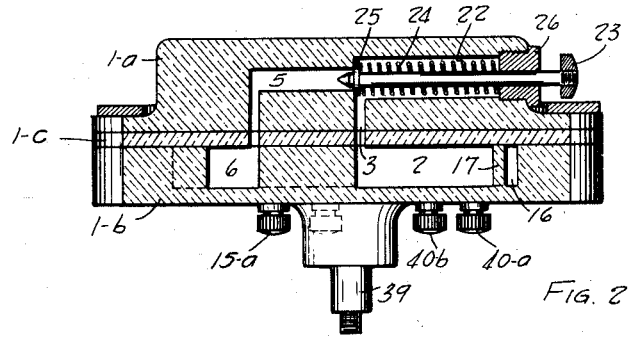
Fig. 2 is a sectional view of the circuit controller taken along the line 2—2 of Fig. 1.

It is the usual practice to protect an electrical circuit with circuit breakers which are automatically opened, as by an overload trip coil, upon the occurrence of various abnormal conditions in the circuit controlled thereby. Such conditions are often of brief duration and, in consequence, the circuit breaker may be closed shortly after opening and remain closed, due to normal conditions having been reestablished. Frequently, abnormal conditions which cause a second opening of the circuit breaker disappear before a second reclosing. The reclosing of a circuit breaker under such conditions may be accomplished automatically by providing an auxiliary circuit controller which is actuated in accordance with movement of the circuit breaker, and which energizes the closing mechanism of the circuit breaker to reclose the same a number of times upon successive opening movements of the circuit breaker, and after a given number of reclosures, to prevent further closing movement of the circuit breaker until the circuit controller has been manually reset.

Our improved electric circuit controller is of general application, but is particularly adapted to complete the closing circuit of a circuit breaker after the breaker has been opened, and will function recurrently, and the number of reclosing operations, and the lag or time interval between successive reclosing movements, may be readily adjusted; where abnormal circuit conditions remain, the circuit controller will reclose the circuit breaker a predetermined number of times, and then lock out to prevent further reclosing until manual adjustment, but if the circuit breaker remains closed for an appreciable length of time after having been opened, the circuit controller automatically resets itself so that in subsequent openings the cycle of reclosing operations starts over again. In the preferred form, the time intervals between successive reclosing movements increase so that the first cycle is completed in the shortest time, which may approach zero so that the first reclosing is substantially instantaneous, and subsequent cycles are completed in increasing lengths of time.

Figs. 1 to 5 disclose the structural features of one form of our improved circuit controller. In this modification the circuit controller comprises a casing or envelope embracing reservoirs, chambers or compartments in fluid intercommunication, as by passages or channels, to form a closed system in which is contained a quantity of fluid. The disposition of the chambers is such as to cause a flow of the fluid between the chambers in a predetermined sequence by the action of gravity upon the movement of the units between their predetermined limiting positions as, for example, the associated circuit breaker is successively opened and closed. These chambers may be conveniently termed refill, measuring and storage chambers.

There is provided contact structure associated with one of the chambers, preferably the measuring chamber, the circuit controlling condition of which is changed in response to the level of fluid therein. A time delay may be imparted in the controlling of this contact structure, in response to the movement of the envelope, by interposing a plurality of restricted orifices or passages through which fluid is conducted to the measuring chamber, with which the contacts are associated. For controlling the contact structure the fluid may comprise a conductive fluid, such as mercury, brine solution or other conductive fluid, and the contact structure may be in communication with the measuring chamber, either mounted directly therein or in recesses communicating with the chamber at a predetermined level. With this latter arrangement, the envelope or casing is of suitable insulating material, well-known examples of which are glass, fused quartz, isolantite, molded vitreous compound, or molded natural or synthetic resin, such as a phenolic condensation product.

In addition, an auxiliary contact structure is associated with an overflow chamber communicating with the storage chamber, the circuit controlling condition of which is changed in response to the level of the fluid in the overflow chamber.

Figure 1:
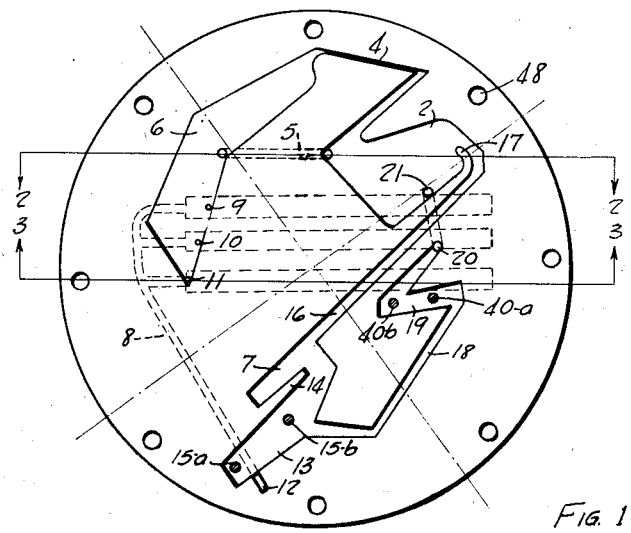
Figure 1 is a diagrammatic view of one form of our improved circuit controller, taken along the line 1—1 of Fig. 3, and showing the arrangement of the various chambers and passages therein.
Figure 3:
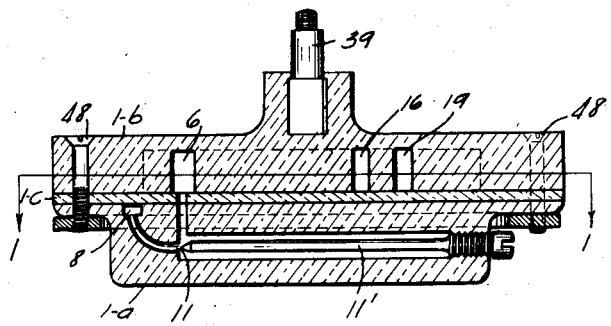
Fig. 3 is a sectional view of the circuit controller taken along the line 3—3 of Fig. 1.

Referring specifically to Figs. 1, 2 and 3, the circuit controller comprises a casing or envelope 1 formed from two generally cylindrical parts 1a and 1b separated by a disk 1c, the parts being secured together in any desired manner, as by screws 48. The component parts of the casing 1 have openings and slotted portions therein which, when the parts are assembled, form the various reservoirs or chambers; that is, the storage chamber 2, refill chamber 6, measuring chamber 13 and overflow chamber 19. These several chambers are connected by various channels or passageways and, in the particular example illustrated, a quantity of mercury is introduced into the system which, upon movement of the envelope between its successive limiting positions, flows through the chambers in a definite sequence under the action of gravity. Under certain conditions, the mercury rises in the measuring chamber 13 to such a level as to bridge the associated contacts 15a, 15b therein, while, under other conditions, the mercury fills the overflow chamber 19 to bridge the contacts 40a, 40b. In Figs. 1 to 5, the mercury is omitted more clearly to show the arrangement and construction of the various chambers and the communicating passages.

Figure 7:
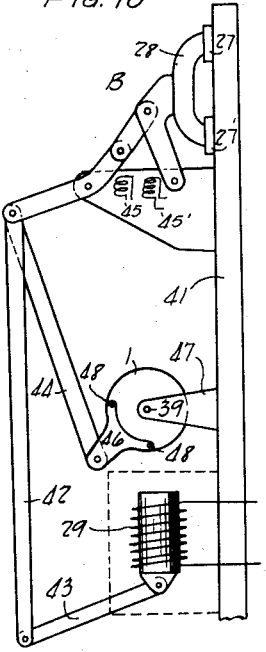
Fig. 7 is a side view of a circuit breaker, and showing the circuit controller cooperating therewith.

As shown in Fig. 7, the casing 1 is rotatably mounted by its shaft 39 turning in a support 47 secured to and extending from the circuit breaker panel 41. The circuit breaker B has a movable bridge member 28 which controls an electrical circuit between the main fixed contacts 27 and 27'. The closing mechanism of the circuit breaker comprises an electromotive device, as a solenoid 29, which, through the action of pivotally-mounted lever 43, link 42, and the toggle mechanism shown, operates to control the position of the main contact element or bridge member 28 of the circuit breaker. It will be understood that the circuit breaker will have latching mechanism, and may have auxiliary or shunt contact structure, various types of which are well-known in the art. Tripping mechanism for automatically opening the circuit breaker when abnormal conditions obtain is diagrammatically indicated by a tripping coil 45; control tripping is accomplished by the trip coil 45'. The circuit controller 1 is mechanically connected by means of an arm 46 and link 44 to the operating mechanism of the circuit breaker, so that the circuit controller is caused to rotate with the movement of the circuit breaker, the angle of rotation in the embodiment illustrated being about 90° during opening or closing movements of the circuit breaker.

A quantity of conductive fluid, for example, mercury, is introduced into the circuit controller, and the rotation or oscillation of the switch causes it to flow from one chamber to another through the intercommunicating passages in a predetermined manner to make contact with and bridge the gap between the fixed contact elements in the chambers. The mercury is introduced into the circuit controller by unscrewing the plug or bushing member 26, Fig. 2, and pouring it into aperture 22, thence it flows through a passage 5, when the valve 25 is lifted, into the refill chamber or reservoir 6.

Figure 8:
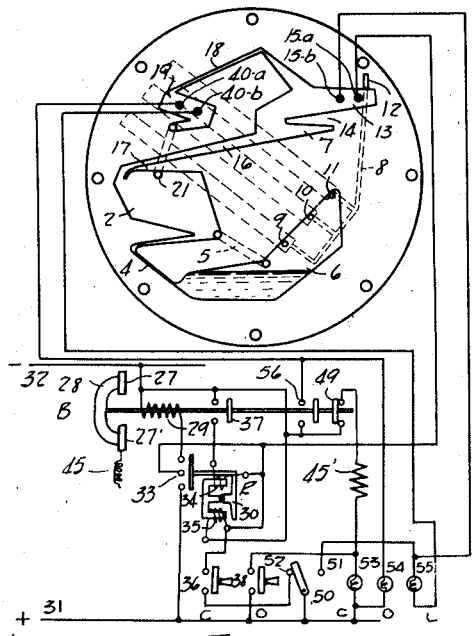
Fig. 8 shows the circuit controller connected in an automatic circuit breaker control system, with the circuit controller in normal position.

Fig. 8 shows the normal position of the circuit controller when the circuit breaker is in closed position, and also the position and level of the mercury in the refill chamber 6. The mercury nearly fills the chamber and remains in it until the switch is rotated to a position corresponding to an open position of the circuit breaker, shown in Fig. 9. When the circuit breaker opens, due to energization of tripping coil 45, a portion of the mercury in chamber 6 flows through the orifices or openings 9, 10 and 11 and through passage 8 into measuring chamber 13. The first flow of mercury covers contact member 15a in the chamber 13 and rises to contact 15b, completing an electrical circuit between the contacts, thus closing the energizing circuit of the circuit breaker closing coil 29. The circuit breaker now recloses and this action causes the circuit controller 1 to rotate approximately 90° in a counterclockwise direction as viewed in Fig. 7. This again changes the relative position of the compartments, and the mercury from the measuring chamber 13 flows over the end of partition 14 into its safety space, and through passage 16 into the storage chamber 2. The passage 8 is formed with a loop 12 where it enters the contact or measuring chamber 13 to prevent the mercury in the chamber from returning to the chamber 6 when the circuit controller has been rotated, due to reclosing movement of the circuit breaker, to the position shown in Fig. 10.

Figure 10:
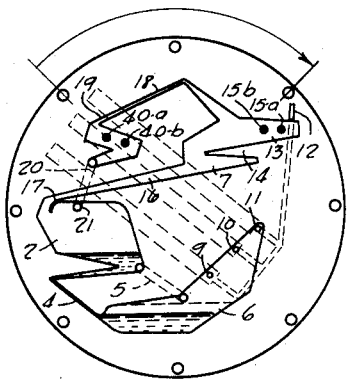
Fig. 10 shows the position of the circuit controller after the first reclosing movement of the circuit breaker.

Fig. 10 shows the position and condition of the circuit controller at this time. The passage 18, overflow chamber 19, and passage 20, provide for an interchange of air by means of an opening 21 from passage 20 into storage chamber 2 to prevent the formation of an air trap through flow of the mercury. The mercury in passage 8 has run back into refill chamber 6. A part of the mercury which was in refill chamber 6 is now in storage chamber 2.

If the circuit breaker again trips, the mercury again flows from chamber 6 into measuring chamber 13 to cover contact elements 15a and 15b and again complete the closing circuit of the circuit breaker. The flow of mercury is slower this time because there is less head or pressure on the openings or passages 10 and 11, and there are also fewer orifices because the mercury level in refill chamber 6 is below orifice 9 at this time. If, after reclosure of the circuit breaker, it is again tripped out, the remaining mercury in chamber 6 will have but one orifice 11 through which to flow, and thus the lag or time interval between successive reclosing movements of the circuit breaker progressively increases. Each of the orifices 9, 10 and 11 is also adjustable, as will be seen from Fig. 3, by means of the valve stems 9', 10' and 11', the positions of which are adjustable by means of the screw threads and slotted heads shown.

Each closing movement of the circuit breaker has caused the mercury in the measuring chamber 13 to flow back into the storage chamber 2, so that when there is insufficient mercury left in chamber 6 to fill chamber 13 to the upper contact 15b, the circuit breaker will be locked out and must be reset or closed by hand or other special means before it will again reclose automatically.

The resetting means is shown in Fig. 2 and comprises a spring-pressed plunger valve 25, the spindle of which passes through bushing 26, and has a handle 23 secured thereto. The lifting of this valve permits the mercury to flow from storage chamber 2 through passages 3 and 5 to return to refill chamber 6, thus setting the circuit controller for another cycle of operation. The valve 25 is so designed that there is no pressure to cause leakage around the stem.

If, after reclosure, the circuit breaker remains closed, an automatic resetting of the circuit controller, after a predetermined time, is obtained by the slow leak passage 4 between storage chamber 2 and refill chamber 6, which permits the slow return or leak of the mercury from chamber 2. After a given time interval, all of the mercury has returned to the refill chamber 6 and the controller is again reset for a further cycle of operations.

A suitable control system embodying our improved circuit controller is shown in Fig. 8, in which a circuit breaker B is closed by the solenoid or closing coil 29. A relay R has an armature 30, which is normally biased by a spring (not shown) to the position in Fig. 8, that is, intermediate the ends or faces of the pole pieces of the windings 34 and 35 of the relay. The armature carries a contact member adapted to close a circuit between contacts 33 and thus controls the flow of actuating current from the positive control bus 31 through contacts 33 and closing coils 29 to the negative side 32 of the control bus. The coil 34 of relay R is an operating coil for the relay, and coil 35 is a holding coil, the coils being simultaneously energized by closure of the manually-operated control switch or push button 36. The coil 34 is stronger than coil 35, and therefore coil 34 causes the armature 30 to be attracted to its pole face and closes contacts 33 to energize the closing coil 29 and close the circuit breaker.

At the end of the closing motion of the circuit breaker, a mechanical or pallet switch 37 opens, deenergizing relay coil 34 and thereby causing the contacts 33 to be opened. If the switch 36 has been held in closed position, the holding coil 35 of the relay remains energized and therefore the armature 30 is attracted to the lower pole face and prevents possible closure of contacts 33, even though the stronger coil 34 is re-energized by the reclosing of the pallet switch 37 due to the breaker opening on overload by trip coil 45. If the circuit breaker is opened on overload, the switch 36 must be opened to release armature 30 and reclosed before the contacts 33 can be engaged. A tripping switch 38 is provided and completes the circuit of the tripping coil 45' when the circuit breaker and pallet switch 49 are closed.

A control selector switch 50 is adapted to be thrown to three positions; when thrown to the right to engage contact 51 it disconnects control switch 36 from the circuit and substitutes the automatic control contacts 15a and 15b, thus providing automatic operation; in midposition, the switch 50 permits manual hand control of the circuit breaker; and when the switch is thrown to the left to engage contact 52, it permits manual remote control, as by switch 36, disconnecting the automatic reclosing circuit controller.

A plurality of signal lamps 53, 54 and 55 indicate the condition of the circuit breaker. Lamp 53 receives current through tripping coil and pallet switch 49, and the lamp burns when the circuit breaker is closed. Lamp 54 receives current through the pallet switch 56 which is open when the circuit breaker is closed, and closed when the circuit breaker is open, and the lamp 54 therefore burns when the circuit breaker is open. Lamp 55 is in circuit with contacts 40a and 40b of the circuit controller, and with pallet switch 56, and the lamp burns when the circuit breaker has been locked open after a cycle of reclosure movement. The lamp 55 is cut out of circuit when control selector switch 50 is moved from the automatic control system, in which position the contact 51 is open.

Figure 9:
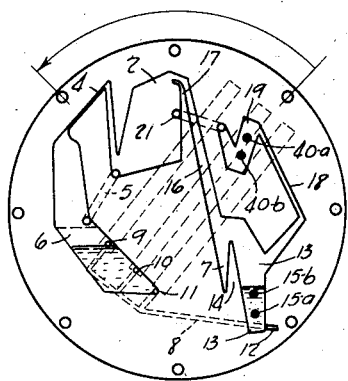
Fig. 9 shows the position of the circuit controller after the first opening movement of the circuit breaker.

As stated above, the first opening of the circuit breaker on overload, or other abnormal condition, rotates the circuit controller to the position shown in Fig. 9, in which position the mercury flows into contact or measuring chamber 13 and closes a circuit between the contacts. In Fig. 10, the circuit controller has been rotated 90° by the reclosing of the circuit breaker, and this leaves contacts 15a and 15b open, since the mercury has flowed into storage chamber 2. During a condition caused by trouble, as by a short circuit on the line controlled by the circuit breaker, this cycle will continue until all the mercury is in storage chamber 2 so that the mercury can no longer complete a circuit across the terminals 15a and 15b.

Under certain conditions, the circuit breaker might start to close but would be opened so quickly, due to an abnormal condition, that the mercury may not have time to flow from passage 16 into storage chamber 2 and, therefore, would run back into the contact chamber 13 if means were not provided to prevent the same. For this reason, a safety space 7 is provided to catch any mercury in the passage 16 at the time the circuit breaker opens. A second safety device is the partition 17 which prevents surges in chamber 2 from flowing over into passage 16. The air vent opening indicated at 21 is very small, and the surface tension of mercury is such that it will not flow through small openings unless the pressure on the mercury is sufficient to overcome the meniscus; for an opening of given size, therefore, a definite minimum head is required before the mercury will flow through the opening 21. The opening is sufficiently large, however, to admit air and thereby facilitate free flow of the mercury through the various chambers and passages.

A further feature of our improved circuit controller is the provision of means by which, after the circuit breaker has completed a number of reclosing movements and is finally locked open, an alarm or other auxiliary circuit is completed for signalling, interlocking or other purposes. This is accomplished by providing the overflow chamber 19 between the vent passages 18 and 20, the chamber containing the spaced contact elements 40a and 40b, connected to a signal circuit to energize a lamp or other indicating device, as shown in Fig. 8. During the reclosing operations of the circuit breaker, the mercury level in storage compartment 2 rises with each cycle, and when the circuit breaker opens at the end of the final cycle, the circuit controller is in the position shown in Fig. 9, and the level of the mercury in chamber 2 is above the opening 21, which opening has been above the mercury level until the last cycle. When the mercury level is a predetermined amount above the opening, the mercury flows through passage 20 into overflow chamber 19 and closes a circuit between the contacts 40a and 40b.

The chamber 19 is so placed that it forms a part of the vent line between chamber 13 and chamber 2, so that only when chamber 2 is full and the circuit breaker is open, can sufficient mercury flow into chamber 19 to close the contacts, and therefore a surge or splash will not cause a sufficient quantity of mercury to enter the chamber to close the contacts; any mercury that should reach the contact 40b will return to storage chamber 2 and not to refill chamber 13.

Figure 12:
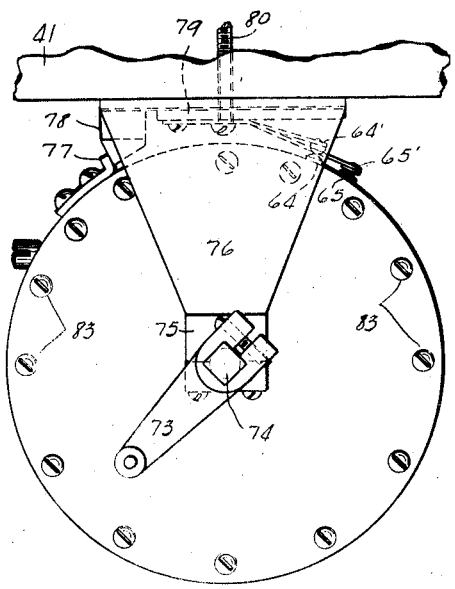
Fig. 12 is a view of the circuit controller of Fig. 11, with its enclosing cover in place.

Figs. 11 to 15 show a modified form of our improved circuit controller. Referring to Figs. 11 and 12, the circuit controller is shown as comprising a cylindrical or disk-shaped body 60, preferably of moldable insulating material, and having formed therein reservoirs or chambers 61, 63 and 66 which, as before, may be conveniently termed refill, measuring and storage chambers, respectively, and interconnecting apertures or passages 62 and 67. The various chambers are closed and sealed by a circular plate 82 of insulating material, secured as by means of screws 83, to the body 60 of the circuit controller. The reservoir 61 contains a suitable contact-controlling fluid, for example, a conductive fluid, as mercury, and in the position shown, which corresponds to open position of the circuit breaker, the mercury may flow through an adjustable orifice or passage 62 to the measuring chamber or cup 63. The measuring chamber is provided with two electrodes or contact members 64 and 65, between which the mercury completes the circuit as it rises to a predetermined level in the measuring chamber. Completion of this circuit energizes the electromotive device 29 of the circuit breaker and, upon closure of the circuit breaker, the control switch is rotated counterclockwise about the shaft 74, spilling the mercury from measuring chamber 63 into the storage chamber 66. If the circuit breaker remains in closed position, the mercury from the storage chamber returns through a restricted or slow-leak passage 67 to the refill chamber 61.

If the circuit breaker does not remain closed, however, but again opens after the first reclosure, the circuit controller will be rotated in a clockwise direction to the position shown in Fig. 11, causing mercury to again flow through the timing tube 62 to again fill the measuring cup or chamber 63 and again close the circuit between electrodes 64 and 65. Upon successive opening movements of the circuit breaker, this cycle of operations will be repeated until insufficient mercury remains in reservoir 61 to fill the measuring chamber 63, at which time the circuit breaker will be locked out until it is closed manually or by means other than the circuit controller. As in the case of the prior modification, the return of the mercury to refill chamber 61 through the slow leak passage 67 will cause the circuit controller automatically to reset itself, after a predetermined time interval, for a subsequent cycle of operations.

Fig. 11a is an enlarged view of the measuring chamber or cup 63 and shows how a quick-make mercury contact is obtained. It will be seen that the electrode 64 does not extend into the measuring cup, but is enclosed in a recess 64a opening into the wall of the measuring chamber, so that the convex meniscus of the mercury in the measuring cup will cause, when the meniscus breaks, a rush of mercury into the recess substantially to cover the electrode 64, and thus not only provide a quick make, but also ensure sufficient depth of the mercury in contact with the electrode to carry an appreciable current. Under certain conditions it might happen that the measuring chamber would remain partially filled with mercury, and vibration or jarring of the switch structure might cause the same to spill over into recess 64a and accidentally close the circuit between electrodes 64 and 65. To prevent this, a slow-leak passage 90 from the bottom of the measuring cup into the storage chamber may be provided, and after a given time interval any mercury remaining in the measuring cup or chamber 63 will flow into the storage chamber 66.

Figs. 14 and 15 show details of the screw-threaded rod member 68 which has a central bore or passage 62. A slotted portion 69 provides an opening from refill chamber 61 to passage 62, the latter passage communicating with a restricted passage 70 at the lower end of the threaded rod. By raising or lowering the rod 68, which adjustment may be performed from the outside of the circuit controller by means of a screw driver slot formed in its upper end, the height of the orifice 70 may be varied within the measuring cup 63 thereby to vary the effective head of the mercury at the orifice 70 and thus to vary the rate of flow of the mercury, so that the circuit controller may be timed to give any desired interval between opening and reclosing movements of the circuit breaker.

The slow-leak passage 67 may also comprise a threaded member 71, having a central bore and a slotted aperture communicating therewith to control the rate of return of mercury to the refill chamber 61. A cap screw 72 may be removed to permit replacement of member 71 by a member with a bore 67 of different diameter.

Movement of the operating mechanism of the circuit breaker is transmitted by means of a link member 44 (shown in Fig. 7) which is pivotally connected to an arm 73, Fig. 12. The circuit controller is mounted on a shaft 74 carried by bearings 75, secured to a U-shaped plate 76, supported by and extending from the panel 41. In Figs. 11 and 12 the circuit controller is shown in a position corresponding to that of the circuit breaker after the first opening.

A stop member 77 mounted on the circuit controller cooperates with fixed stop member 78 mounted on the panel 41 to insure that when the circuit controller is in the position shown, that is, corresponding to open position of the circuit breaker, the terminals or contacts 64 and 65 will be in a proper position to engage complementary fixed spring contacts 64' and 65' secured to and extending from the panel 41. The spring contacts are insulated from the U-shaped support 76 in any suitable manner, as by a sheet of insulation 79, and the contacts are connected to an external circuit by means of screw-threaded terminals 80. The contacts 64' and 65' do not make or break any current and, therefore, cannot be considered circuit controlling. Flexible conductors or slip rings and brushes may be substituted for the contacts shown, if desired.

Figure 13:
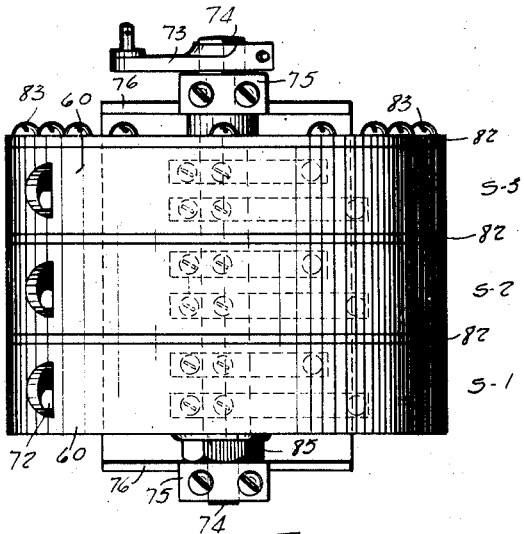
Fig. 13 is a front elevational view of an assembly of units of the type shown in Fig. 12.

While periodic reclosing of the circuit breaker may be obtained by inserting in the reservoir 61 a sufficient amount of mercury or other conductive fluid to fill the measuring cup 63 several times, if greater time differences between successive reclosing movements are desirable or necessary, the amount of mercury may be limited to one reclosure, and a plurality of similar units S1, S2, S3, Fig. 13, may be employed, having different timing characteristics, and arranged so that a progressively increasing time interval is obtained between successive reclosings of the circuit controller in response to successive and correlated movements thereof. For illustration, the first unit S1 may have a passage 62, Fig. 11, of such cross-section that mercury or other conductive fluid will flow from reservoir 61 and fill the measuring chamber 63 to close the circuit between the terminals or electrodes 64 and 65 in a given time, and an amount of mercury in the reservoir sufficient for but one filling of the measuring chamber; this unit will therefore cause a first reclosing movement of the circuit breaker within the time required for the mercury to flow through passage 62 and fill the measuring chamber, after which there is insufficient mercury in the reservoir to refill the measuring chamber, so that the unit will be inoperative for successive reclosing movements. If desired, the timing of the passage 62 of the unit S1 may be made small, with zero as the lower limit, so that the first operation of the circuit controller may be substantially instantaneous.

Unit S2 has a more restricted passage 62 than that of unit S1, so that a longer time is required to fill its measuring chamber or cup, and it will therefore not operate to reclose the circuit breaker upon the first opening, the mercury which has partially filled the measuring chamber flowing into the storage chamber 66 upon the first reclosing movement. In the unit S2 the amount of mercury in the reservoir 61 must, of course, be sufficient to fill the measuring cup if the circuit breaker opens for the second time, upon which occurrence the unit will reclose the breaker for the second reclosing movement. After the second reclosing movement, unit S2 has insufficient mercury in its reservoir to again fill its measuring chamber and, therefore, becomes inoperative.

Unit S3 has a more restricted passage 62 than that of unit S2, and has sufficient mercury in its reservoir 61 to fill its measuring chamber 63 and reclose the circuit breaker after the third successive opening. If the circuit breaker again opens, the unit S3 will be inoperative because of insufficient mercury in its reservoir, and therefore the circuit breaker will remain locked out until it is manually or otherwise reset.

In the arrangement including a plurality of units, the contact structure associated with each unit is adapted to have its circuit controlling condition changed in the same sense; that is, either opened or closed. By connecting these contact structures in circuit with each other, successive and correlated movements of the units will then successively effect a change in the circuit condition of the several of contact structures until they have all operated, when the circuit controller will become inoperative. It will be obvious that, if desired, the alarm contacts 40a and 40b of the first described modification may be associated with that unit having the greatest time delay, to give an indication when the circuit controller has been locked in its inoperative condition.

It will be understood that the circuit controller of the invention can be employed with various other control circuits known in the art, and that the use of the circuit controller is not limited to an automatic circuit breaker or switching mechanism, but may be used in manually-controlled systems or wherever movement of a mechanical member is indicative of the condition of a given apparatus, and which has means controllable by an electric circuit for restoring the device to its original position or condition.

The action of our improved circuit controller, particularly its time-delay action, depends upon movement at a controlled rate from one chamber to another of a fluid, or equivalent, under the influence of gravity; when a measured amount of the fluid has reached a lower chamber, the circuit controlling condition of electric contact structure is affected thereby. Preferably, and as shown, a conductive fluid, such as mercury, brine solution, or the like, is employed to close a circuit between spaced electrodes. Other fluids may be used, however, and may be non-conductive, for example, oils of various types in which the change in viscosity with temperature change is not too great, glycerine, etc., and these fluids caused to actuate movable contact structure when a predetermined volume of the fluid enters one of the contact enclosing chambers. Such contact structure may comprise float switch mechanism, weighing cups, etc., various types of which are well-known in the art, positioned in the contact controlling chambers to control the position of movable contacts, and the contacts may be either of the normally closed or normally open type, dependent upon the nature of the energizing circuit for the electromotive closing device.

While we have described what we at present consider the preferred embodiments of our invention, it will be obvious to those skilled in the art that various changes and modifications may be made without departing from our invention and we, therefore, aim in the appended claims to cover all such changes and modifications as fall within the true spirit and scope of our invention.

We claim:

1. An electric circuit controller comprising a contact structure, means including a single envelope containing a quantity of fluid effective, upon successive movements of said envelope to a given position, successively to change the circuit controlling condition of said contact structure, fluid flow control means effective to limit the number of successive changes of the circuit controlling condition of said contact structure in response to successive and correlated movements of said envelope, and additional fluid flow control means effective to impart a time delay in each change of the circuit controlling condition of said contact structure after the corresponding movement of said envelope.

2. An electric circuit controller comprising an envelope embracing a plurality of chambers and movable between predetermined positions, said chambers being in fluid intercommunication to form a single closed system containing a quantity of fluid, contact structure the circuit controlling condition of which is changed in response to a predetermined level of fluid in one of said chambers, said chambers being so related that successive and correlated movements of said envelope to one of said positions are effective successively to deliver sufficient quantities of fluid to said one chamber to effect said predetermined level therein for a predetermined number of times only, and means for controlling the flow of fluid into said one chamber to impart a time delay to the change of the circuit controlling condition of said contact structure.

3. An electric circuit controller comprising an envelope embracing a plurality of chambers and movable between predetermined positions, said chambers being in fluid intercommunication to form a single closed system including a quantity of conductive fluid, a contact structure in communication with one of said chambers and disposed to be bridged by said conductive fluid when it rises to a predetermined level therein, said chambers being so related that successive and correlated movements of said envelope to one of said positions are effective successively to deliver to said contact chamber sufficient quantities of fluid to bridge said contact structure for a predetermined number of times only, and a constriction in the path of flow of fluid into said contact chamber effective to impart a time delay in the closing of said contact structure after the movement of said envelope into position to fill said contact chamber.

4. An electric circuit controller comprising an envelope movable between predetermined positions and embracing three or more chambers in fluid intercommunication to form a single closed system, a quantity of fluid contained in said system, a contact structure the circuit controlling condition of which is changed in response to a predetermined level of fluid in a first one of said chambers, a second chamber disposed to discharge fluid by gravity into said first chamber in one of said positions of said envelope and having a fluid capacity a multiple of said first chamber, said first chamber being disposed to discharge fluid by gravity into a third of said chambers in the other position of said envelope, and said third chamber being disposed to discharge by gravity into said second chamber in said other position of said envelope, a restricted passage limiting said last-named discharge, and a second restricted passage between said second and first chambers effective to impart a time delay into the change of the circuit controlling condition of said contact structure after movement of said envelope into said first-named position.

5. An electric circuit controller comprising a pivotally mounted envelope movable between normal and resetting positions and including a fluid system comprising a storage chamber, a measuring chamber, and a refill chamber disposed effectively above said measuring chamber in the normal position of said envelope, a quantity of electrically conductive fluid contained in said system, a restricted passage connected to conduct fluid at a predetermined rate from said refill chamber to said measuring chamber in the normal position of said envelope, said measuring chamber being disposed effectively above said storage chamber and said storage chamber effectively above said refill chamber in the resetting position of said envelope, a passage connected freely to conduct fluid from said measuring chamber to said storage chamber in said latter position of said envelope, a restricted passageway connected to conduct fluid from said storage chamber to said refill chamber in said resetting position of said envelope, and a pair of contacts in communication with said measuring chamber.

6. An electric circuit controller comprising a contact structure, means including an envelope containing a quantity of fluid effective, upon successive movements of said envelope to a given position, successively to change the circuit controlling condition of said contact structure, and a plurality of independent fluid flow control means for introducing independent time delays into the successive changes of the circuit controlling condition of said contact structure after the respective movements of said envelope.

7. An electric circuit controller comprising a contact structure, means including an envelope containing a quantity of fluid effective, upon successive movements of said envelope to a given position, successively to change the circuit controlling condition of said contact structure, and a plurality of independently variable orifices for governing the flow of fluid in said envelope and effective to introduce independently variable time delays into the successive changes of the circuit controlling condition of said contact structure after the respective movements of said envelope.

8. An electric circuit controller comprising a contact structure, means including an envelope embracing a chamber containing a quantity of fluid effective, upon successive movements of said envelope to a given position, successively to change the circuit controlling condition of said contact structure, and means for introducing independent time delays into the successive changes of the circuit controlling condition of said contact structure comprising a plurality of orifices spaced with respect to the fluid level in said chamber.

9. An electric circuit controller comprising a contact structure, means including an envelope embracing a chamber containing a quantity of fluid effective, upon successive movements of said envelope to a given position, successively to change the circuit controlling condition of said contact structure, and means for introducing different time delays into the successive changes of the circuit controlling condition of said contact structure comprising a plurality of passages communicating with said chamber and so spaced with respect to the fluid level therein that successive increments of fluid will flow from said chamber through a different number of said passages.

10. An electric circuit controller comprising a contact structure, means including an envelope embracing a chamber containing a quantity of fluid effective, upon successive movements of said envelope to a given position, successively to change the circuit controlling condition of said contact structure, and means for introducing progressively increasing time delays into the successive changes of the circuit controlling condition of said contact structure comprising a plurality of passages communicating with said chamber and vertically and uniformly spaced with respect to the fluid level therein.

11. An electric circuit controller comprising an envelope embracing a measuring chamber and a refill chamber and containing a quantity of fluid, a contact structure the circuit controlling condition of which is changed in response to a predetermined level of fluid in said measuring chamber, and means for successively changing the circuit controlling condition of said contact structure upon successive movements of said envelope to a given position and with independent time delays thereafter comprising a plurality of passages interconnecting said chambers to conduct fluid to said measuring chamber in said given position, said passages being vertically spaced with respect to the fluid level in said refill chamber in said given position.

12. An electric circuit controller comprising a contact structure, means including an envelope containing a quantity of fluid effective, upon successive movements of said envelope to a given position, successively to change the circuit controlling condition of said contact structure, fluid control means effective to limit the number of successive changes of the circuit controlling condition of said contact structure in response to successive and correlated movements of said envelope, and a plurality of other independent fluid control means for introducing independent time delays into the successive changes of the circuit controlling condition of said contact structure after the respective movements of said envelope.

13. An electric circuit controller comprising an envelope embracing a plurality of chambers and movable between predetermined positions, said chambers being in fluid intercommunication to form a single closed system, a quantity of conductive fluid contained within said system, a pair of contacts in communication with one of said chambers and disposed to be bridged by said conductive fluid when it rises to a predetermined level therein, said chambers being so related that successive and correlated movements of said envelope to one of said positions are effective successively to deliver sufficient quantities of fluid to said one chamber to effect said predetermined level therein for a predetermined number of times only, and a plurality of independently variable orifices for governing the flow of said conductive fluid into said contact chamber to introduce independently variable time delays in the closing of said contacts after respective movements of said envelope.

14. An electric circuit controller comprising a pivotally mounted envelope movable between normal and resetting positions and including a fluid system comprising a storage chamber, a measuring chamber and a refill chamber disposed effectively above said measuring chamber in the normal position of said envelope, a quantity of fluid contained in said system, a plurality of independent restricted passages connected to conduct fluid from said refill chamber to said measuring chamber in the normal position of said envelope and communicating with said refill chamber at vertically-spaced points, said measuring chamber being disposed effectively above said storage chamber and said storage chamber effectively above said refill chamber in the resetting position of said envelope, a passage connected freely to conduct fluid from said measuring chamber to said storage chamber in said latter position of said envelope, a restricted passageway connected to conduct fluid from said storage chamber to said refill chamber in said resetting position of said envelope, and a contact structure the circuit controlling condition of which is changed in response to a predetermined level of fluid in said measuring chamber.

15. An electric circuit controller comprising a contact structure, means including an envelope embracing a chamber containing a quantity of fluid effective, upon successive movements of said envelope to a given position, successively to change the circuit controlling condition of said contact structure, an auxiliary chamber, a passage interconnecting said chambers to conduct fluid to said auxiliary chamber when the fluid in said first chamber rises above a predetermined level, and an auxiliary contact structure the circuit controlling condition of which is controlled in response to the fluid level in said auxiliary chamber.

16. An electric circuit controller comprising an envelope movable between two limiting positions and including a fluid system comprising a storage chamber, a refill chamber, a measuring chamber, and fluid-conducting passages interconnecting said chambers, a quantity of fluid contained in said system, contact structure the circuit controlling condition of which is changed in response to a predetermined level of fluid in said measuring chamber, said chambers and passages being so disposed that successive movements of said envelope between said limiting positions effect a flow of fluid between said chambers in the above-named sequence, thereby intermittently filling said measuring chamber to said predetermined level, the passageway between said storage chamber and said refill chamber including a restriction effective to limit the number of refillings of said measuring chamber in response to successive and correlated movements of said envelope, an overflow chamber connected to be filled from said storage chamber when the fluid therein rises above a predetermined level, and an auxiliary contact structure the circuit controlling condition of which is controlled by the fluid in said overflow chamber.

17. An electric circuit controller comprising a contact structure, means including a single envelope containing a quantity of fluid effective, upon successive movements of said envelope to a given position, successively to change the circuit controlling condition of said contact structure, a restricted fluid passage effective to limit the number of successive changes of the circuit controlling condition of said contact structure in response to successive and correlated movements of said envelope, means for varying said restricted passage to vary the number of said successive changes, a second restricted fluid passage effective to impart a time delay in each change of the circuit controlling condition of said contact structure after corresponding movements of said envelope, and means for adjusting said second restricted passage to vary said time delay.

18. An electric circuit controller comprising a plurality of envelopes movable together between predetermined positions, a contact structure associated with each of said envelopes, and a quantity of fluid contained in each of said envelopes, and fluid flow control means included in said envelopes effective, upon successive movements of said envelopes to one of said positions, successively to change the circuit controlling condition of a single one of said contact structures and in a predetermined sequence.

19. An electric circuit controller comprising a plurality of envelopes movable together between predetermined positions, a contact structure associated with each of said envelopes, said contact structures being interconnected for jointly controlling a circuit, a quantity of fluid in each of said envelopes, said quantities of fluid being effective, upon successive movements of said envelopes to one of said positions, successively to change the circuit controlling conditions of said contact structures in a predetermined sequence, and means cooperating with each envelope to limit the number of times the circuit controlling condition of its respective contacts is changed in response to successive and correlated movements of said envelopes to limit the number of controlling operations of the circuit controller by the joint action of said contact structures.

20. An electric circuit controller comprising a plurality of envelopes movable together between predetermined positions, a contact structure associated with each of said envelopes, said contact structures being interconnected for jointly controlling a circuit, a quantity of fluid in each of said envelopes effective upon movement thereof to one of said positions to change the circuit controlling condition of its associated contact structure, fluid flow control means connected with each envelope and effective to limit the number of times the circuit controlling condition of its associated contact structure is changed in response to successive and correlated movements of said envelopes, and time delay means associated with each of said envelopes to impart a time delay in the changes of the circuit controlling conditions of said contact structures after the successive movements of said envelopes whereby the circuit controller effects only a predetermined number of controlling operations separated by time intervals.

21. An electric circuit controller comprising a plurality of envelopes movable together between predetermined positions, a contact structure associated with each of said envelopes, said contact structures being interconnected for jointly controlling a circuit, a quantity of fluid in each of said envelopes effective, upon movement thereof to one of said positions, to change the circuit controlling condition of its associated contact structure, fluid flow control means connected with each envelope and effective to limit the operation of the fluid contained therein to a single change of the circuit controlling condition of its associated contact structure in response to successive and correlated movements of said envelopes, and a plurality of other fluid control means individual to said envelopes and effective to impart different time delays to the changes of the circuit controlling conditions of said contact structures after successive movements of said envelopes whereby the circuit controller effects only a predetermined number of controlling operations separated by different time intervals.

22. An electric circuit controller comprising a plurality of envelopes movable together between normal and resetting positions, each of said envelopes embracing a chamber and including a quantity of electrically conductive fluid, a pair of electrical contacts in communication with each of said chambers and disposed to be bridged by said fluid when it rises to a predetermined level therein, said contacts being interconnected for jointly controlling a circuit, restricted passages individual to said envelopes connected to conduct fluid at different rates to their respective chambers in the normal position of said envelopes, and a plurality of other restricted passages individual to said envelopes effective to limit the flow of fluid therein in response to successive and correlated movements thereof to a single filling of said chambers whereby the circuit controller effects only a predetermined number of controlling operations separated by different time intervals.

23. An electric circuit controller comprising an envelope movable between normal and resetting positions and including a fluid system comprising at least three chambers, a quantity of conductive fluid in said system, said chambers being so relatively disposed that movement of the envelope between said positions effects the flow of said fluid through said chambers in a predetermined sequence, means for restricting the flow of fluid from a first to a second of said chambers, a contact structure in said second chamber disposed to be bridged by said fluid, an unrestricted fluid communication from said second chamber to a third one of said chambers, and means for restricting the flow of fluid from said third chamber to said first chamber.

24. A mercury switch comprising an envelope movable between a first position and a second position and embracing a first chamber and a second chamber, a measuring cup disposed in said second chamber and having contact structure in communication therewith, a quantity of mercury disposed in said envelope, flow timing means effective in said first position of said envelope to control the flow of mercury from said first chamber into said cup, said cup being disposed to discharge freely into said second chamber in said second position of said envelope, and means effective to limit the rate of fluid flow from said second chamber to said first chamber.

25. A mercury switch comprising an envelope oscillatable between two positions, a quantity of mercury disposed in said envelope, two contact structures in communication with said envelope at spaced points, a first of said contact structures being disposed normally to be bridged by said mercury in one position of said envelope and to be out of contact therewith in the other of said positions, and means for controlling the flow of mercury within said envelope and effective to maintain said mercury out of contact with said first contact structure in said one position after a predetermined number of operations of said switch within a predetermined time, and the second of said contact structures being disposed normally to be out of contact with said mercury in either position of said envelope but to be bridged thereby after said predetermined number of operations within said predetermined time.

GEORGE A. HEALIS.
HERBERT C. GRAVES, JR.